B. F. HENRY.
Baking Pan and Cover.

No. 208,173. Patented Sept. 17, 1878.

WITNESSES
Mary J. Utley.
F. J. Masi.

INVENTOR
Benjamin F. Henry,
by E. W. Anderson
his ATTORNEY

UNITED STATES PATENT OFFICE.

BENJAMIN F. HENRY, OF NEAR MIAMI, ASSIGNOR TO HIMSELF AND WILLIAM E. YOUNG, OF SALINE COUNTY, MISSOURI.

IMPROVEMENT IN BAKING-PANS AND COVERS.

Specification forming part of Letters Patent No. 208,173, dated September 17, 1878; application filed June 29, 1878.

*To all whom it may concern:*

Be it known that I, BENJAMIN F. HENRY, of near Miami, in the county of Saline and State of Missouri, have invented a new and valuable Improvement in Baking-Pans and Covers; and I do hereby declare that the following is a full, clear, and exact description of the construction and operation of the same, reference being had to the annexed drawings, making a part of this specification, and to the letters and figures of reference marked thereon.

Figure 1:
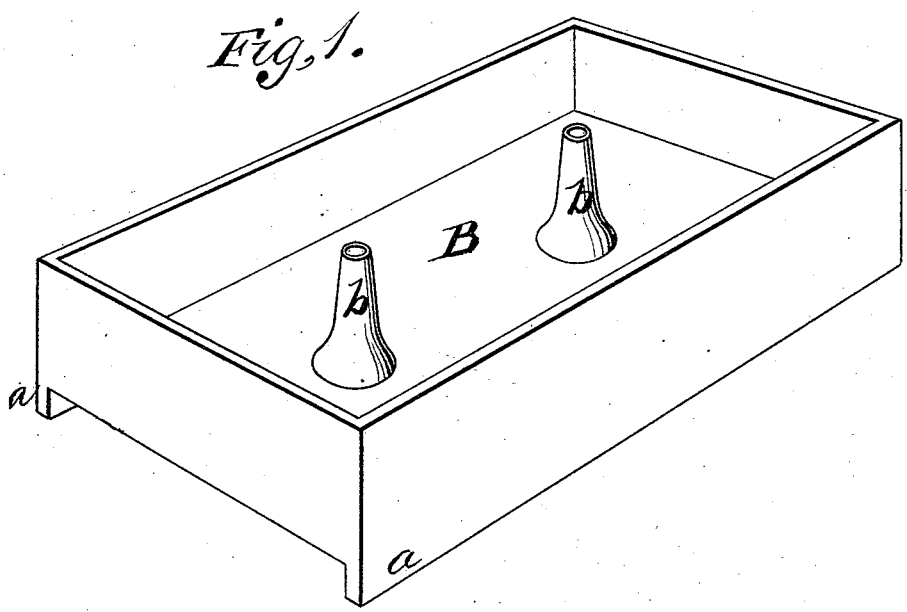
Figure 2:
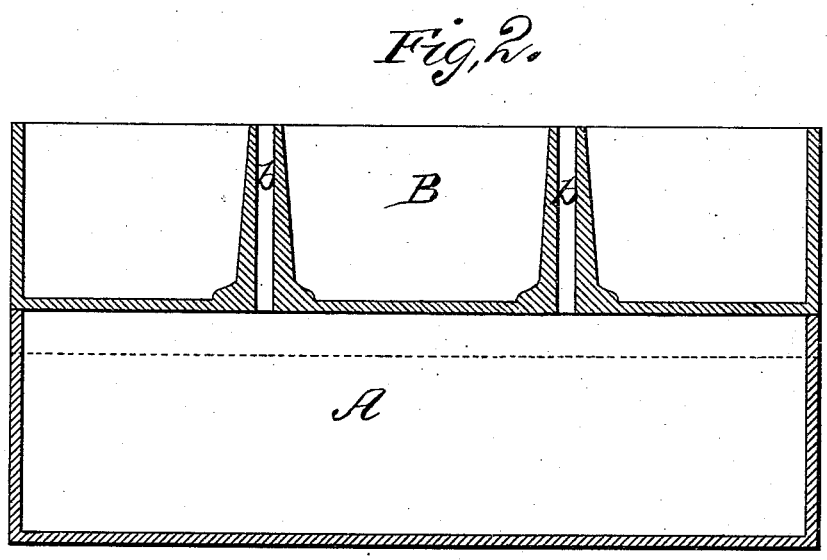

Figure 1 of the drawings is a representation of a perspective view of the baking-pan cover, and Fig. 2 is a longitudinal section of the pan and cover.

The nature of the invention consists in the construction and novel arrangement of parts, as will be hereinafter more fully shown and described.

The object of my invention is to prevent the upper part of the food being baked from burning, forming a crust, or cracking, and to brown or color the said upper part to suit individual tastes, or according to the nature of the material being cooked.

The nature of the invention consists in combining, with a baking-pan, a removable water-vessel fitting snugly thereon, and provided with tubes extending through its bottom, whereby the desired result is effectually attained, as will be hereinafter more fully set forth.

In the annexed drawings, the letter A designates an ordinary baking-pan, and B a water-vessel of the same general shape, and fitting snugly thereon, being held against lateral displacement by means of the flanges $a$ upon its bottom, that receive the pan between them. The water-vessel B is provided with one or more tubes, $b$, the object of which will be clearly shown hereinafter.

This pan, being rectangular, is adapted to be used with any of the rectangular-oven stoves, and, after having been filled with the bread or other articles, the said pan may be placed in the oven, and when the top of the article being cooked has been sufficiently browned the cover B, having the desired quantity of water placed therein, is slid upon the top of the pan A, the guides $a$ keeping it in proper position, thus avoiding the necessity of removing the pan A from the stove during the process of baking.

During the baking, steam generated in the pan A passes out therefrom through the tubes $b$, that form with vessel B close joints, and extend up above the top of the water therein.

What I claim as new, and desire to secure by Letters Patent, is—

The combination, with the rectangular pan A, of the rectangular sliding hollow cover B, provided with guide-flanges $a$, and having the vapor-escape tubes $b$ opening through and flush with its bottom, substantially as specified.

In testimony that I claim the above I have hereunto subscribed my name in the presence of two witnesses.

BENJAMIN F. HENRY.

Witnesses:
WILLIAM E. YOUNG,
JOHN N. COUDREY.